United States Patent
Shimizu et al.

(10) Patent No.: US 10,903,463 B2
(45) Date of Patent: Jan. 26, 2021

(54) BATTERY PACK

(71) Applicants: Kabushiki Kaisha Toshiba, Minato-ku (JP); Toshiba Infrastructure Systems & Solutions Corporation, Kawasaki (JP)

(72) Inventors: Norio Shimizu, Ibaraki (JP); Toshinori Uchida, Fuchu (JP); Kazuto Kuroda, Arakawa (JP); Masahiro Sekino, Shinjuku (JP)

(73) Assignees: Kabushiki Kaisha Toshiba, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 70 days.

(21) Appl. No.: 16/084,410

(22) PCT Filed: Mar. 16, 2016

(86) PCT No.: PCT/JP2016/058383
§ 371 (c)(1),
(2) Date: Sep. 12, 2018

(87) PCT Pub. No.: WO2017/158773
PCT Pub. Date: Sep. 21, 2017

(65) Prior Publication Data
US 2019/0081292 A1 Mar. 14, 2019

(51) Int. Cl.
*H01M 2/00* (2006.01)
*H01M 2/10* (2006.01)
(Continued)

(52) U.S. Cl.
CPC .......... *H01M 2/1077* (2013.01); *H01M 2/10* (2013.01); *H01M 2/206* (2013.01); *H01M 2/30* (2013.01); *H01M 2/22* (2013.01); *H01M 2220/20* (2013.01)

(58) Field of Classification Search
CPC .......... H01M 2/30; H01M 2/206; H01M 2/22; H01M 2/1077
See application file for complete search history.

(56) References Cited

U.S. PATENT DOCUMENTS

2009/0072785 A1 3/2009 Moon
2011/0129704 A1 6/2011 Han et al.
(Continued)

FOREIGN PATENT DOCUMENTS

CN 101393974 A 3/2009
EP 2 280 436 A2 2/2011
(Continued)

OTHER PUBLICATIONS

International Search Report dated May 10, 2016 in PCT/JP2016/058383 filed Mar. 16, 2016.

*Primary Examiner* — Cynthia H Kelly
*Assistant Examiner* — Monique M Willis
(74) *Attorney, Agent, or Firm* — Oblon, McClelland, Maier & Neustadt, L.L.P.

(57) ABSTRACT

A battery pack includes a casing, a plurality of battery cells, and a first connector, for example. The casing includes a first outer wall and a protrusion that is provided on the first outer wall and protrudes outward from the first outer wall. The battery cells include an electrode terminal and are housed in the casing. The first connector is provided on the protrusion and is electrically connected to the electrode terminal.

12 Claims, 14 Drawing Sheets

(51) Int. Cl.
*H01M 2/20* (2006.01)
*H01M 2/30* (2006.01)
*H01M 2/22* (2006.01)

(56) References Cited

U.S. PATENT DOCUMENTS

| | | | |
|---|---|---|---|
| 2013/0207612 A1* | 8/2013 | Lev | H01M 10/482 |
| | | | 320/134 |
| 2014/0120392 A1* | 5/2014 | Ueno | H01G 11/76 |
| | | | 429/90 |
| 2014/0242427 A1 | 8/2014 | Tanaka et al. | |
| 2015/0037662 A1 | 2/2015 | Pinon et al. | |
| 2015/0132630 A1* | 5/2015 | Kim | H01M 2/204 |
| | | | 429/121 |
| 2015/0180093 A1 | 6/2015 | Han et al. | |
| 2016/0013467 A1 | 1/2016 | Kawata et al. | |

FOREIGN PATENT DOCUMENTS

| | | |
|---|---|---|
| EP | 2 328 205 A2 | 6/2011 |
| JP | 2010-153128 A | 7/2010 |
| JP | 2010-244873 A | 10/2010 |
| JP | 2011-49151 A | 3/2011 |
| JP | 2012-134092 A | 7/2012 |
| JP | 2014-157774 A | 8/2014 |
| JP | 2014-165102 A | 9/2014 |

* cited by examiner

BATTERY PACK

CROSS-REFERENCE TO RELATED APPLICATIONS

This application is national stage application of International Application No. PCT/JP2016/058383, filed Mar. 16, 2016, which designates the United States, incorporated herein by reference.

FIELD

Embodiments described herein relate generally to a battery pack.

BACKGROUND

Conventionally, battery packs that include a casing for housing a plurality of batteries and outputs the electric power of the batteries from a terminal block are known.

It is preferable to provide such a battery pack of a novel structure with less inconvenience in work for attaching a connecting member, to which the electric power is transmitted from the battery pack, to the battery pack, for example.

DETAILED DESCRIPTION

Figure 1:
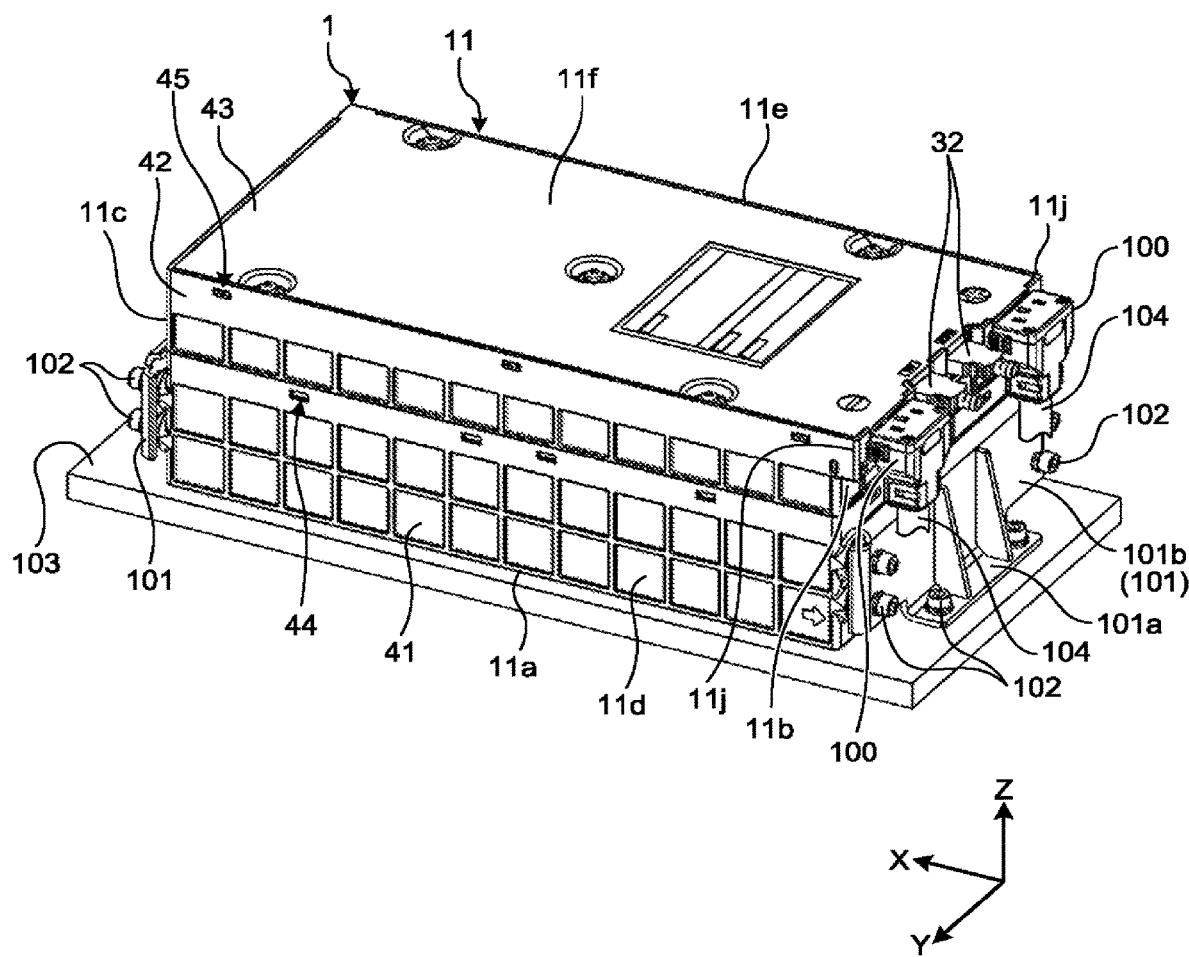
FIG. 1 is a schematic and exemplary perspective view of a battery pack of a first embodiment, while the battery pack is placed on a mount.

According to an embodiment, a battery pack includes a casing, a plurality of battery cells, and a first connector, for example. The casing includes a first outer wall and a protrusion that is provided on the first outer wall and protrudes outward from the first outer wall. The battery cells includes an electrode terminal and are housed in the casing. The first connector is provided on the protrusion and is electrically connected to the electrode terminal.

The following discloses exemplary embodiments of the present invention. The features of the embodiments and actions and results (effects) attained by the features described below are merely exemplary.

The embodiments disclosed below include similar or same elements. In the following, the similar or same elements are denoted by common reference numerals, and overlapping description is omitted. In the following drawings, directions are defined for the sake of convenience. X direction is the longitudinal direction of a casing 11 and the width direction of battery cells 12. Y direction is the lateral direction of the casing 11 and the thickness direction of the battery cells 12. Z direction is the height direction of the casing 11 and the height direction of the battery cells 12. The X direction, the Y direction, and the Z direction are orthogonal to one another.

First Embodiment

Figure 2:
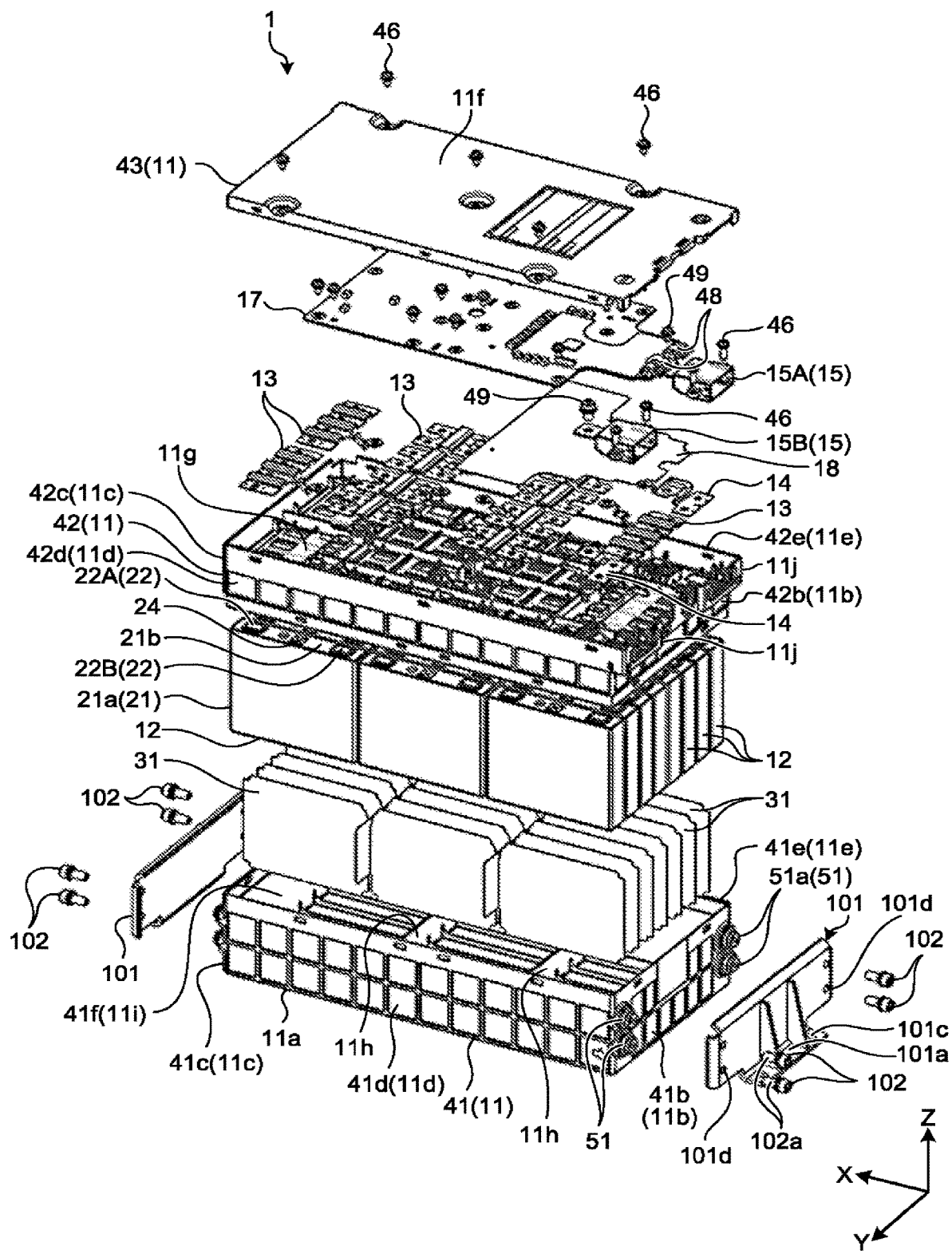
FIG. 2 is a schematic and exemplary exploded perspective view of the battery pack and a fixing structure in the first embodiment.

As illustrated in FIGS. 1 and 2, this battery pack 1 includes a casing 11, a plurality of battery cells 12, conductive members 13 and 14, connectors 15A and 15B, and a circuit board 17, for example. The casing 11 houses the battery cells 12, the conductive members 13 and 14, the connectors 15A and 15B, and the circuit board 17. The battery cells 12 are electrically connected to each other with a plurality of conductive members 13. The electric power of the battery cells 12, that is, the electric power of the battery pack 1 can be output to external connectors 100 (connecting member) via the conductive members 14 and the connectors 15A and 15B. The battery pack 1 can be fixed to a mount 103 with brackets 101 and bolts 102. One of the connectors 15A and 15B is a positive electrode connector while the other of the connectors 15A and 15B is a negative electrode connector. In the following, the connectors 15A and 15B may be generally referred to as connectors 15. The battery pack 1 can also be referred to as a battery module or a battery device. The casing 11 can also be referred to as a case or a container. The battery cells 12 can also be referred to as cells or batteries. The connectors 15 are an example of a first connector. The external connectors 100 are an example of a second connector.

The battery cells 12 are a lithium-ion secondary battery, for example. The battery cells 12 may be another battery such as a nickel-hydrogen battery, a nickel-cadmium battery, or a lead storage battery.

As illustrated in FIG. 2, the battery cells 12 are thin flat rectangular parallelepipeds in one direction (the Y direction, for example). The battery cells 12 each include a casing 21, a positive electrode terminal 22A, a negative electrode terminal 22B, and a valve 24. The casing 21 contains an electrode and an electrolyte (not illustrated). The electrode can be formed of positive and negative electrode sheets being power generation elements wound in a spiral form via a separator, as an example. The electrode can be formed of a positive electrode sheet and a negative electrode sheet laminated via a separator, as an example. The positive electrode terminal 22A and the negative electrode terminal 22B are connected to the positive electrode sheet and the negative electrode sheet of the electrode, respectively. In the following, the positive electrode terminal 22A and the negative electrode terminal 22B may be generally referred to as electrode terminals 22.

The casing 21 has a thin flat rectangular parallelepiped shape in one direction (the Y direction, for example) as an example. The casing 21 is formed of a metallic material (aluminum, an aluminum alloy, or stainless, for example) or a synthetic resin material. The casing 21 is formed as an assembly of a housing 21a and a lid 21b. The housing 21a is a substantially rectangular parallelepiped box with an open top, and contains the electrode and the electrolyte. The lid 21b covers the open top of the housing 21a. The casing 21 can also be referred to as a container.

The positive electrode terminal 22A and the negative electrode terminal 22B are provided on the lid 21b and protrude from the outer face of the lid 21b. The positive electrode terminal 22A and the negative electrode terminal 22B are spaced apart from each other in the X direction, that is, the longitudinal direction of the lid 21b. The positive electrode terminal 22A and the negative electrode terminal 22B are each formed of a conductive material.

The valve 24 is disposed between the positive electrode terminal 22A and the negative electrode terminal 22B in the lid 21b. The valve 24 is opened to reduce the pressure within the casing 21 when exceeding a threshold.

The battery cells 12 are arranged in three rows, for example, within the casing 11. The battery cells 12 are arranged such that the outer faces of lids 21b are oriented in the same direction (the Z direction as an example) and that the long sides of the lids 21b are oriented in the same direction (the X direction as an example). The battery cells 12 are electrically connected to each other in series or in parallel via the conductive members 13. The conductive members 13 are formed of a conductive material such as aluminum, for example. The conductive members 13 can also be referred to as bus bars, connecting members, or coupling members.

As illustrated in FIG. 1, the exterior of the casing 11 is a long rectangular parallelepiped in one direction (the X direction). As illustrated in FIGS. 2 to 6, the casing 11 has a plurality of walls (walls) such as a bottom wall 11a, end walls 11b and 11c, side walls 11d and 11e, a top wall 11f, an intermediate wall 11g (refer to FIG. 2), and partitioning walls 11h (refer to FIG. 2). The end wall 11b is an example of a first outer wall, and the bottom wall 11a is an example of a second outer wall.

The bottom wall 11a has a quadrangular (e.g., rectangular) plate shape. The bottom wall 11a extends along the XY plane. The outer face of the bottom wall 11a has a planar shape.

The end walls 11b and 11c have a quadrangular (e.g., rectangular) plate shape and are connected to the longitudinal ends of the bottom wall 11a (the X direction). The end walls 11b and 11c extend in a direction crossing the bottom wall 11a (a direction orthogonal thereto or the YZ plane as an example). The end walls 11b and 11c are spaced apart from each other substantially in parallel in the longitudinal direction of the bottom wall 11a (the X direction).

The side walls 11d and 11e have a quadrangular (e.g., rectangular) plate shape and are connected to both lateral (the Y direction) ends of the bottom wall 11a. The side walls 11d and 11e extend in a direction crossing the bottom wall 11a (a direction orthogonal thereto or the XZ plane as an example). The side walls 11d and 11e are spaced apart from each other substantially in parallel in the lateral direction of the bottom wall 11a (the Y direction). The side walls 11d and 11e are connected to the adjacent end walls 11b and 11c.

The top wall 11f has a quadrangular (e.g., rectangular) plate shape. The top wall 11f is connected to the ends of the end walls 11b and 11c and the side walls 11d and 11e opposite the bottom wall 11a. The top wall 11f is spaced apart from the bottom wall 11a in the thickness direction of the bottom wall 11a (the Z direction). The top wall 11f extends substantially in parallel to the bottom wall 11a.

The intermediate wall 11g has a quadrangular (e.g., rectangular) plate shape. The intermediate wall 11g is located between the bottom wall 11a and the top wall 11f. The intermediate wall 11g extends substantially in parallel to the bottom wall 11a and the top wall 11f. The intermediate wall 11g is connected to the inner faces of the end walls 11b and 11c and the side walls 11d and 11e.

The partitioning walls 11h have a quadrangular (e.g., rectangular) plate shape. The partitioning walls 11h are located between the bottom wall 11a and the intermediate wall 11g and are connected to the bottom wall 11a. The partitioning walls 11h are aligned with the end walls 11b and 11c. The partitioning walls 11h are substantially in parallel to the end walls 11b and 11c. The partitioning walls 11h are aligned (in parallel as an example) with their faces facing each other. The spacing of the partitioning walls 11h is substantially constant.

The casing 11 contains a chamber 11i (refer to FIG. 2) surrounded by the bottom wall 11a, the end walls 11b and 11c, the side walls 11d and 11e, and the intermediate wall 11g. The chamber 11i is sectioned into a plurality of areas (chambers) by the partitioning walls 11h and spacers 31. One battery cell 12 is housed in each of the areas.

The end wall 11b of the casing 11 is provided with two protrusions 11j. The two protrusions 11j are disposed on the end of the end wall 11b on the top wall 11f side. The protrusions 11j extends across the end wall 11b and the top wall 11f. The protrusions 11j each protrude (overhang) outward from an outer face 11ba of the end wall 11b. The two protrusions 11j are spaced apart from each other in the lateral direction of the casing 11 (the Y direction). The connectors 15 are arranged on the respective protrusions 11j. The protrusions 11j can also be referred to as overhangs.

The casing 11 is formed of a synthetic resin material having insulating properties (modified polyphenylene ether (PPE), perfluoroalkoxy alkane (PFA), or tetrafluoroethylene-perfluoroalkyl vinyl ether copolymer, for example). For the synthetic resin material of the casing 11, thermoplastic resins can be used; examples thereof include crystalline resins such as olefin resins such as PE, PP, and PMP, polyester resins such as PET, PBT, and PEN, POM resins, polyamide resins such as PA6, PA66, and PA12, PPS resins, and LCP resins and alloy resins thereof; and noncrystalline resins such as PS, PC, PC/ABS, ABS, AS, modified PPE, PES, PEI, and PSF and alloy resins thereof.

As illustrated in FIG. 2 and else, the casing 11 is formed as an assembly of two or more members, specifically, a housing 41, an intermediate member 42, and a lid member 43. The intermediate member 42 is placed on one end of the housing 41 to join together. The lid member 43 is placed on one end of the intermediate member 42 to join together. The chamber 11*i* is surrounded by the housing 41 and the intermediate member 42.

The housing 41 has the bottom wall 11*a*, end walls 41*b* and 41*c* of the end walls 11*b* and 11*c*, side walls 41*d* and 41*e* of the side walls 11*d* and 11*e*, and the partitioning walls 11*h*. The housing 41 is provided with an opening 41*f* (a recess or a space) surrounded by the bottom wall 11*a*, the end walls 41*b* and 41*c*, and the side walls 41*d* and 41*e*. The opening 41*f* forms at least part of the chamber 11*i*.

The intermediate member 42 has end walls 42*b* and 42*c* of the end walls 11*b* and 11*c*, side walls 42*d* and 42*e* of the side walls 11*d* and 11*e*, the intermediate wall 11*g*, and at least part of the protrusions 11*j*. The intermediate member 42 covers the opening 41*f* of the housing 41. The intermediate wall 11*g* is connected to the middle parts of the end walls 42*b* and 42*c* and side walls 42*d* and 42*eu* in the thickness direction of the bottom wall 11*a* (the Z direction or the height direction of the casing 11).

The lid member 43 includes the top wall 11*f* and at least part of the protrusions 11*j*.

The housing 41 and the intermediate member 42 are mechanically joined together with a coupling 44, while the intermediate member 42 and the lid member 43 are mechanically joined together with a coupling 45. In other words, the housing 41 and the lid member 43 are joined together via the intermediate member 42. At the coupling 44, tabs on the end walls 42*b* and 42*c* and the side walls 42*d* and 42*e* of the intermediate member 42 are hooked by the end walls 41*b* and 41*c* of the housing 41 and the side walls 11*d* and lie to join the intermediate member 42 and the housing 41. At the coupling 45, tabs on the lid member 43 are hooked by the side walls 42*d* and 42*e* of the intermediate member 42 to thereby join the lid member 43 and the intermediate member 42.

In the casing 11 as structured above, as described above, the battery cells 12 are housed in the opening 41*f* of the housing 41 being part of the chamber 11*i*. The insulating spacers 31 are arranged between adjacent battery cells 12. The spacers 31 separate two adjacent battery cells 12 from each other. The spacers 31 are sheets formed of an insulating material, for example. The spacers 31 can also be referred to as partitioning walls (walls).

The positive electrode terminal 22A and the negative electrode terminal 22B of the battery cells 12 protrude toward the top wall 11*f* of the intermediate wall 11*g* through through-holes (openings) in the intermediate wall 11*g*.

A chamber 11*k* (a space) is provided between the intermediate wall 11*g* and the top wall 11*f* to house the conductive members 13 and 14, the connectors 15A and 15B, the circuit board 17, and a plate member 18. The conductive members 13 and 14 are welded to the electrode terminals (the positive electrode terminal 22A and the negative electrode terminal 22B) of the battery cells 12, for example. The connectors 15A and 15B are joined to the intermediate member 42 with fasteners 46 such as screws. The circuit board 17 is joined to the lid member 43 with the fasteners 46 such as screws.

The circuit board 17 is a printed circuit board (PCB), for example. The circuit board 17 is provided with a wiring pattern, on which a plurality of electronic components is mounted. The circuit board 17 is electrically connected to the conductor members 13 and can detect the temperature of the conductor members 13 and the voltage of the battery cells 12, for example. Two (two or more) connectors 48 are mounted on the circuit board 17. The connectors 48 are LAN connectors (communication connectors), for example. The connectors 48 are exposed from openings 42*b*1 in the end wall 42*b* of the intermediate member 42. The connectors 48 are placed between the two protrusions 11*j*, that is, between the connectors 15A and 15B. Connectors 32 (refer to FIG. 7) of LAN cables are connected to the connectors 48, for example. Via the LAN cables, a control device receives results of the detection of the circuit board 17 to control the voltage of the battery cells 12, for example.

The following describes the connectors 15, the conductive members 14, and the protrusions 11*j* in detail. The two conductive members 14, the two connectors 15, and the two protrusions 11*j* have similar structures, therefore, one of the conductive members 14, the connectors 15, and the protrusions 11*j* (the end wall 11*d* side or the near side in FIG. 2) will be mainly described below.

Figure 8:
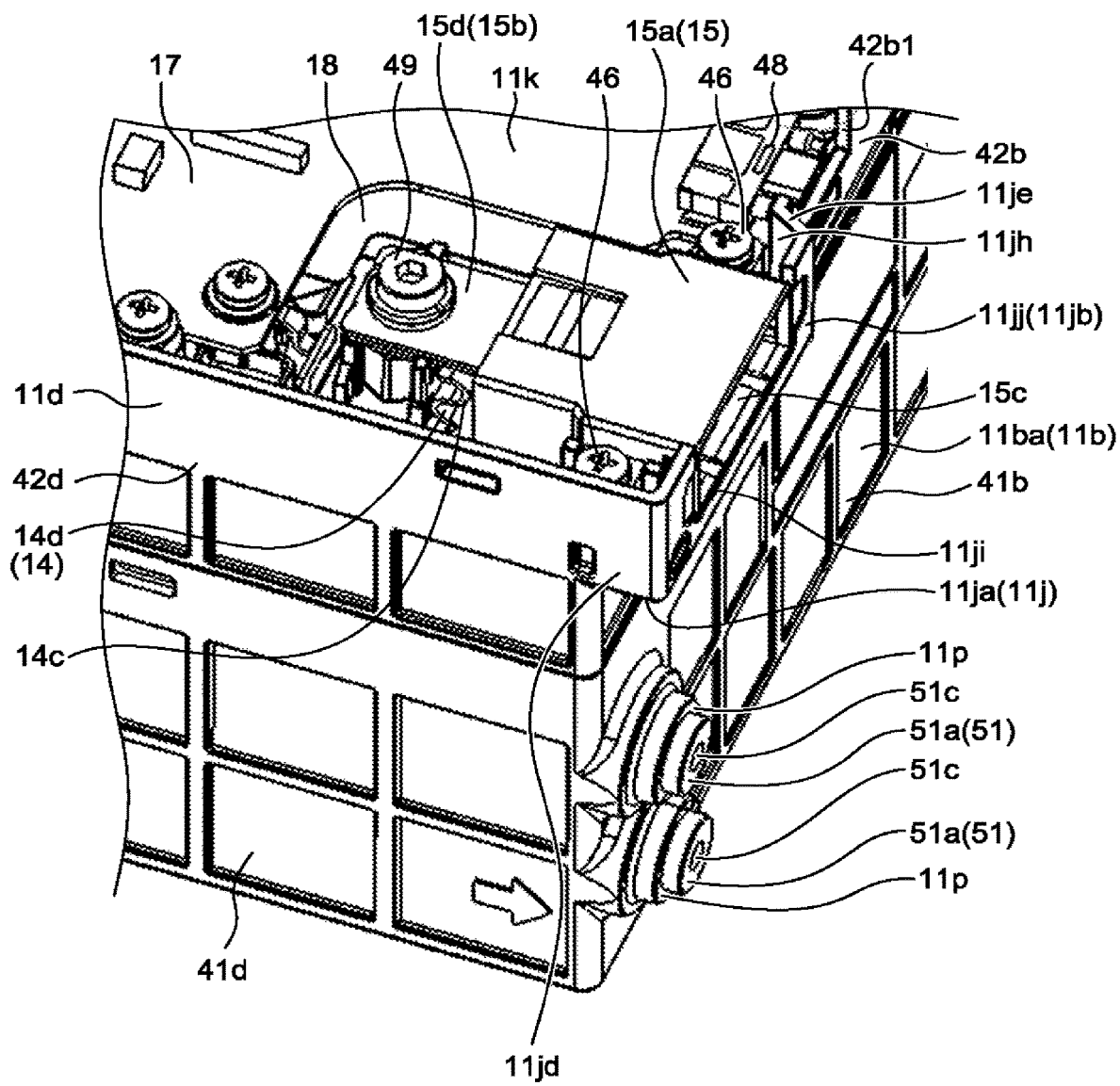
FIG. 8 is a schematic and exemplary side view of a part of the battery pack of the first embodiment.
Figure 9:
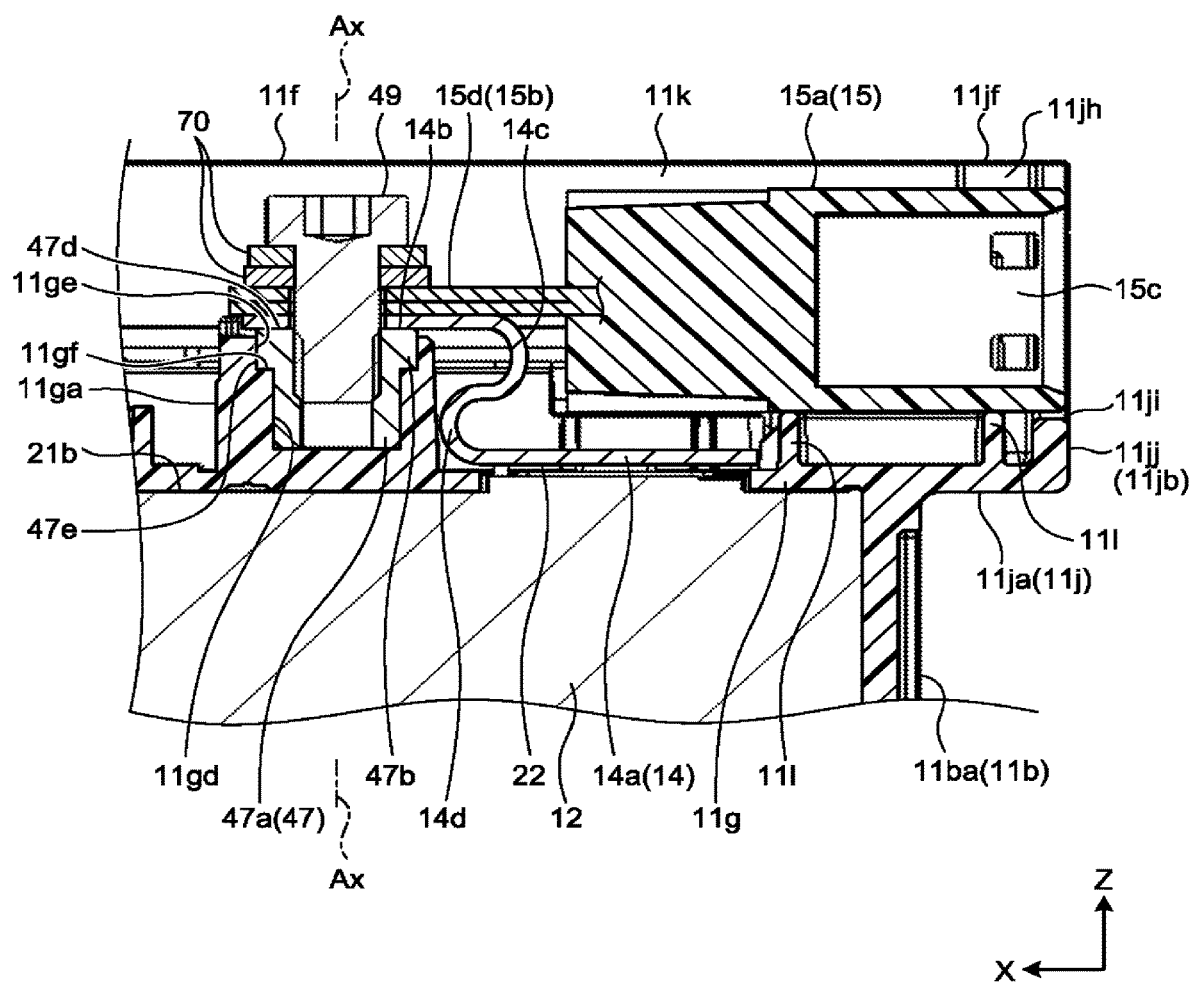
FIG. 9 is a schematic and exemplary sectional view of a part of the battery pack of the first embodiment.

As illustrated in FIGS. 8 and 9, the protrusion 11*j* has a bottom wall 11*ja*, an end wall 11*jb*, side walls 11*jd* and 11*je*, and a top wall 11*jf*. The bottom wall 11*ja* extends from the intermediate wall 11*g*. The side wall 11*jd* extends from the side wall 11*d* (the side wall 42*d*). The side wall 11*je* is opposite the side wall 11*jd* in the Y direction (the side wall 11*e* side) and is spaced apart from the side wall 11*jd* in the Y direction. The top wall 11*jf* extends from the top wall 11*f*. The end wall 11*jb* is connected to the bottom wall 11*ja*, the side walls 11*jd* and 11*je*, and the top wall 11*jf*. In the other of the two protrusions 11*j* (the side wall 11*e* side or the far side in FIG. 2), the side wall 11*je* extends from the side wall 11*e* (the side wall 42*e*), while the side wall 11*jd* is located in the Y direction of the side wall 11*je* (the side wall 11*d* side).

The protrusion 11*j* has an end face 11*jj* in the protruding direction of the protrusion 11*j* (as an example, the opposite X direction or rightward in FIG. 9). The end face 11*jj* forms the outer face of the end wall 11*jb*. The protrusion 11*j* contains a chamber 11*jh* (a space or a chamber). The chamber 11*jh* opens to the end face 11*jj*. The chamber 11*jh* includes an opening 11*ji* passing through the end wall 11*jb* (the end face 11*jj*). The chamber 11*jh* communicates with the chamber 11*k*.

In the present embodiment, the connectors 15 are female connectors, and the external connectors 100 are male connectors. The connectors 15 each have an insulating body 15*a* and a conductive member 15*b* supported by the body 15*a*. The body 15*a* is provided with an opening 15*c*. The external connector 100 is inserted into the opening 15*c*, whereby the connector 15 and the external connector 100 are fitted to each other. In the present embodiment, the insertion direction (fitting direction or attachment direction) of the external connector 100 into the connector 15 is opposite to the protruding direction of the protrusion 11*j* (the X direction). In other words, the external connector 100 is moved oppositely to the protruding direction of the protrusion 11*j* (the X direction) and attached to the connector 15. The body 15*a* is formed of a synthetic resin material. FIG. 9 schematically illustrates the internal structure of the connector 15.

The conductive member 15*b* is supported by the body 15*a* while partially embedded in the body 15*a*. The conductive member 15*b* is electrically connected to a terminal provided in the body 15*a*. The terminal is electrically connected to a terminal of the external connector 100. The conductive member 15*b* includes a terminal 15*d* that protrudes from the body 15*a* oppositely to the opening 15*c* of the body 15*a*. The terminal 15*d* has a flat plate shape. The terminal 15*d* is electrically connected to the electrode terminal 22 via the conductive member 14. The conductive member 15*b* is formed of a conductive material such as aluminum. The conductive member 15b can also be referred to as a bus bar, a connecting member, or a coupling member.

At least part of the connector 15 is housed in the chamber 11jh, with the opening 15c exposed from the opening 11ji of the protrusion 11j, and the body 15a and the terminal 15d aligned in the thickness direction of the end wall 11b (the X direction). In the present embodiment, part of the body 15a is housed in the chamber 11jh while the rest of the body 15a and the terminal 15d are housed in the chamber 11k, as an example. The body 15a and the connector 15 may be entirely housed in the chamber 11jh. Both sides of the body 15a in the Y direction are joined with at least one of the intermediate wall 11g and the bottom wall 11ja with fasteners 46. The body 15a is pressed against a protrusion 11l that protrudes from the intermediate wall 11g and the bottom wall 11ja toward the connector 15. In other words, the body 15a is supported by the protrusion 11l. The conductive member 15b is an example of a second conductive member.

The conductive member 14 includes two terminals 14a and 14b and two (two or more) bent parts 14c and 14d. The terminal 14a is electrically connected to the electrode terminal 22. The terminal 14a is placed on the electrode terminal 22 and welded (joined) thereto, for example. The terminal 14b is electrically connected to the connector 15. The terminals 14a and 14b are spaced apart from each other in the Z direction. The bent parts 14c and 14d are aligned in the Z direction between the terminals 14a and 14b. The bent part 14c is connected to the terminal 14a. The bent part 14c is of convex form protruding in the X direction and has a substantially U-shape (a curved shape) with an open end in the opposite X direction. The bent part 14d is connected to the bent part 14c and the terminal 14b. The bent part 14d is of convex form protruding in the opposite X direction and has a substantially U-shape (a curved shape) with an open end in the X direction. In the conductive member 14 having such a structure, at least the bent parts 14c and 14d can function as elastic parts (springs). When the terminal 15d of the connector 15 vibrates about fixed points by the fasteners 46 in the Z direction, the bent parts 14c and 14d become elastically deformed, for example. This can relax stress concentration on the terminals 14a, 14b, and 15d and the electrode terminal 22. The bent part 14c may have a shape other than the U-shape (curved shape). The bent part 14c may be substantially of V-shape, for example. The conductive members 14 are formed of a conductive material such as aluminum. The conductive members 14 can also be referred to as bus bars, connecting members, or coupling members. The terminal 14a is an example of a first terminal, and the terminal 14b is an example of a second terminal.

The terminal 15d of the connector 15 and the terminal 15d of the conductive member 15b are joined together with a nut 47 and a male screw member 49. The nut 47 and the male screw member 49 are connected to each other inside the casing 11 (the chamber 11k). Specifically, the terminal 15d of the connector 15, the terminal 15d of the conductive member 15b, and a washer 70 are held between the nut 47 and the male screw member 49 in the Z direction. The nut 47 is an example of a first screw member and a first nut, and the male screw member 49 is an example of a second screw member.

Figure 10:
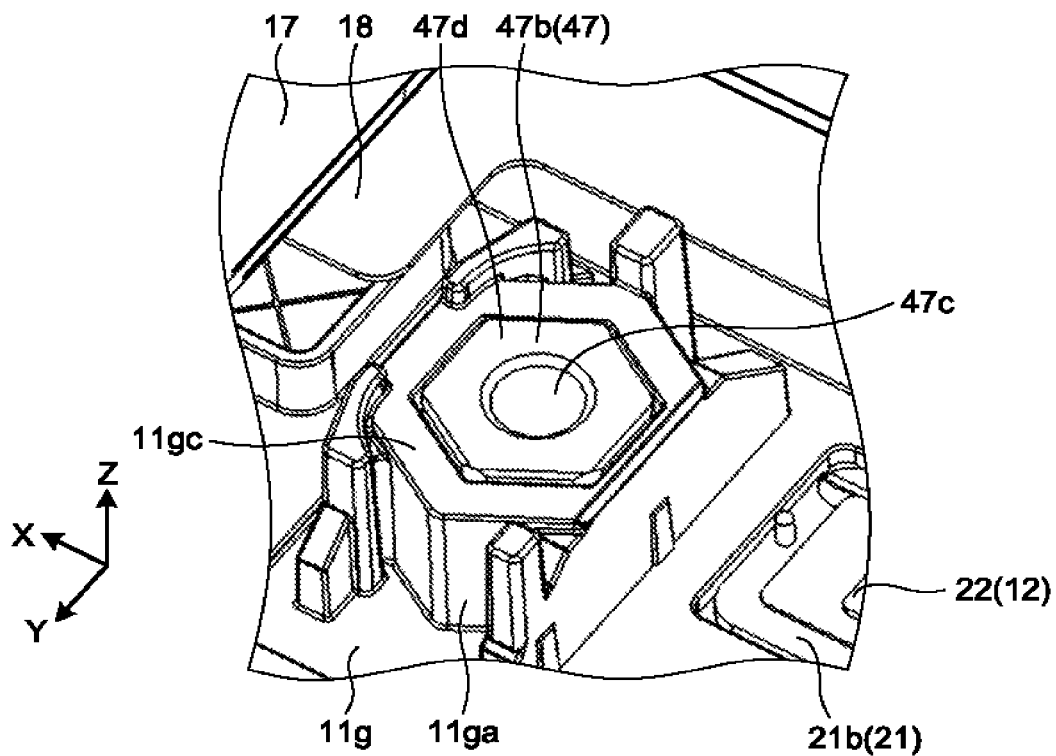
FIG. 10 is a schematic and exemplary perspective view of a part of a casing of the battery pack of the first embodiment, while a first nut is supported by a support.
Figure 12:
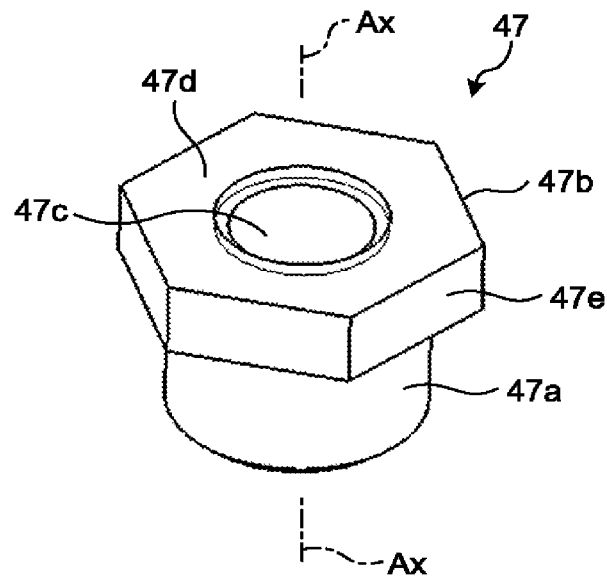
FIG. 12 is a schematic and exemplary perspective view of the first nut of the battery pack of the first embodiment.

As illustrated in FIGS. 10 and 12, the nut 47 includes a tube 47a into which the male screw member 49 is inserted, and a flange 47b. The tube 47a has an annular shape (a cylindrical shape as an example) about a central axis Ax. The central axis Ax extends in the Z axis direction. The inside (inner circumference) of the tube 47a is provided with a female screw 47c. The nut 47 can be formed of a metallic material such as brass or iron, for example. The surface of the nut 47 can be plated with nickel.

The flange 47b projects radially outward from the Z-directional end of the tube 47a. The flange 47b has a face 47d forming the end face of the nut 47 in the Z direction. The terminal 14b of the conductive member 14 and the terminal 15d of the conducting member 15b are stacked on the face 47d (refer to FIG. 9). The face 47d is an example of a first face.

The flange 47b has a non-circular shape when viewed in the axial direction of the central axis Ax (the Z direction). In other words, an outer circumference 47e of the flange 47b about the central axis Ax has a plurality of parts in different distances from the central axis Ax in a direction orthogonal to the central axis Ax when viewed in the direction along the central axis Ax. In the present embodiment, the flange 47b has a hexagonal (polygonal) shape when viewed in the direction along the central axis Ax, for example.

Figure 11:
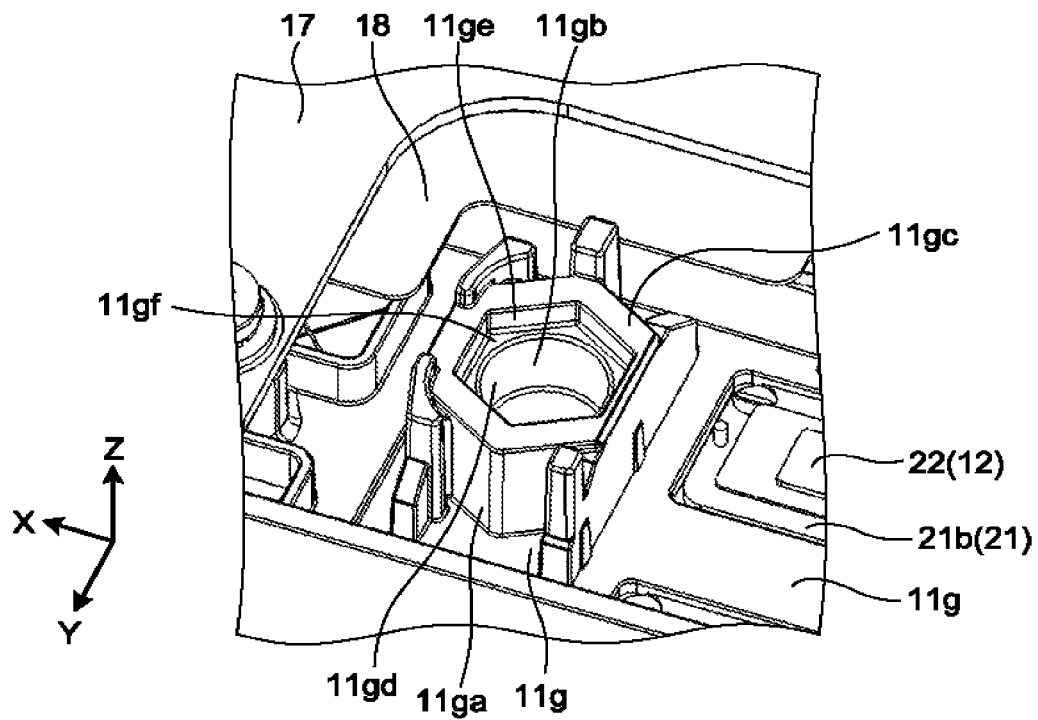
FIG. 11 is a schematic and exemplary perspective view of the part of the casing of the battery pack of the first embodiment, while the first nut is detached from the support.

The nut 47 is movably supported by a support 11ga in the axial direction of the central axis Ax (the Z direction). As illustrated in FIGS. 9 to 11, the support 11ga is disposed on the intermediate wall 11g of the casing 11. The support 11ga is provided with an opening 11gb (a through hole). The opening 11gb houses the nut 47.

The support 11ga has an end face 11gc in the protruding direction of the support 11ga and faces 11gd, 11ge, and 11gf being the inner face of the support 11ga. The end of the nut 47 including the face 47d protrudes from the end face 11gc. The faces 11gd, 11ge, and 11gf face the opening 11gb. The face 11gd has a shape (a cylindrical shape) that extends along the outer circumference of the tube 47a of the nut 47 to surround the tube 47a. The face 11ge has a shape (non-circular or hexagonal shape as an example) that extends along the outer circumference 47e of the flange 47b of the nut 47 to surround the outer circumference 47e. The face 11gf is located between the face 11gd and the face 11ge, extending along the XY plane. The face 11gf supports the flange 47b in the axial direction of the central axis Ax (the Z direction). The face 11ge is an example of a second face.

The support 11ga with the above structure movably supports the nut 47 in the axial direction of the central axis Ax (the Z direction). The face 11ge, while being in contact with the outer circumferential face 47e, restricts the rotation of the nut 47 about the central axis Ax.

In the present embodiment, the support 11ga can be formed integrally with the intermediate member 42 by resin molding. For this reason, the face 11gd has a tapered shape with an increasing diameter (tube diameter) toward the end face 11gc. In other words, the face 11gd includes a draft. In contrast, the face 11ge has a constant diameter. With this configuration, the support 11ga is inhibited from being defectively shaped, preventing a decrease in the contact area between the face 11gd and the outer circumference 47e of the flange 47b.

Figure 6:
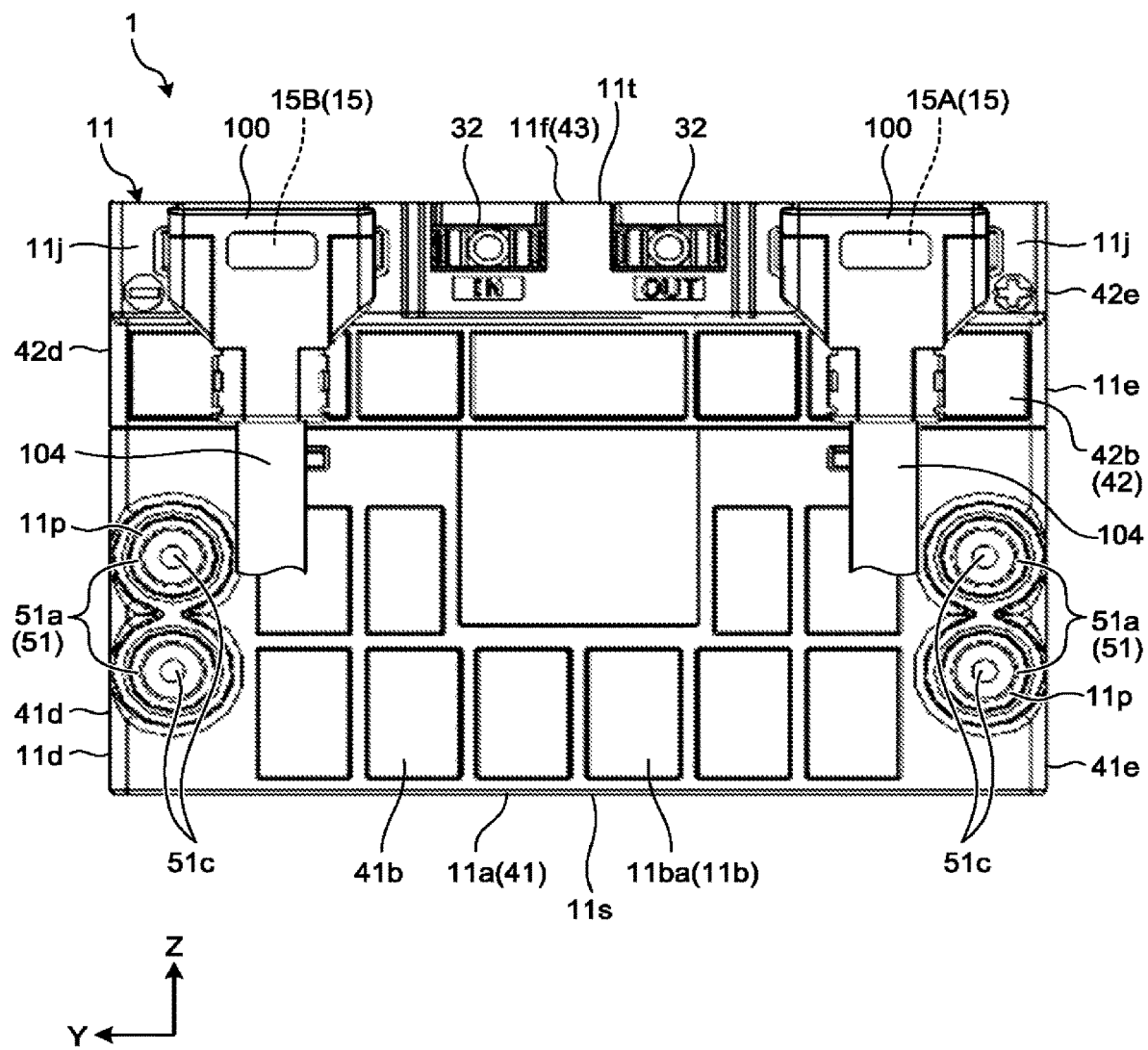
FIG. 6 is a schematic and exemplary elevational view of the battery pack of the first embodiment.
Figure 7:
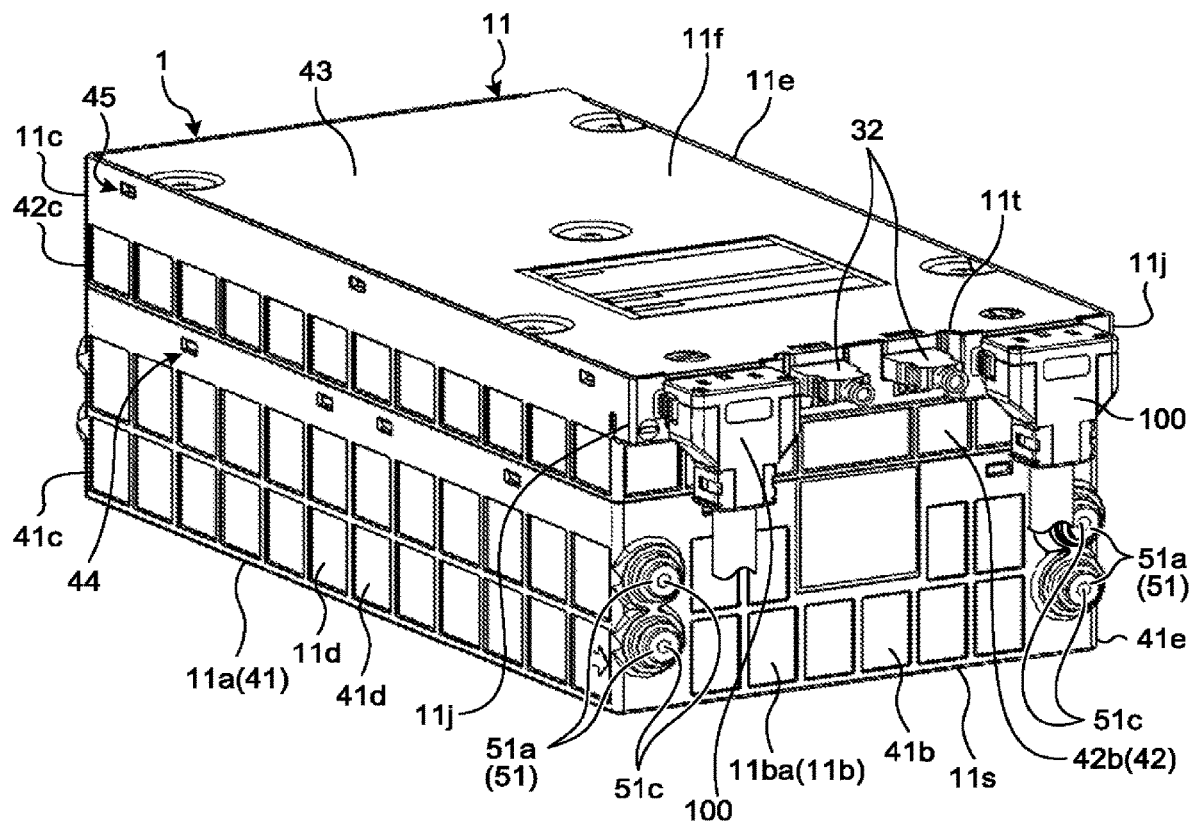
FIG. 7 is a schematic and exemplary perspective view of the battery pack of the first embodiment, while external connectors are connected to the battery pack.

In the above configuration, as illustrated in FIGS. 6 and 7, with the external connectors 100 and the connectors 15 connected to each other, cables 104 connected to the external connector 100 extend along the end wall 11b toward a bottom end 11s of the end wall 11b. In other words, the cables 104 extend in a direction crossing the insertion direction of the external connectors 100 into the connectors 15 (the X direction). There is a gap between the cables 104 and the outer face 11ba of the end wall 11b.

As illustrated in FIG. 1, the battery pack 1 is fixed to the mount 103 with the brackets 101 and the bolts 102, for example. The mount 103 has a rectangular (quadrangular) plate shape extending along the bottom wall 11a of the casing 11, for example. The mount 103 can also be referred to as a support member, a radiating member, a tray member, a shelf member, or a slide member. The battery pack 1, the brackets 101, and the mount 103 are an example of a battery unit. In the present embodiment, a plurality of battery units can be aligned in the same attitude in the Y direction, for example. The mount 103 is an example of a second support member.

Figure 4:
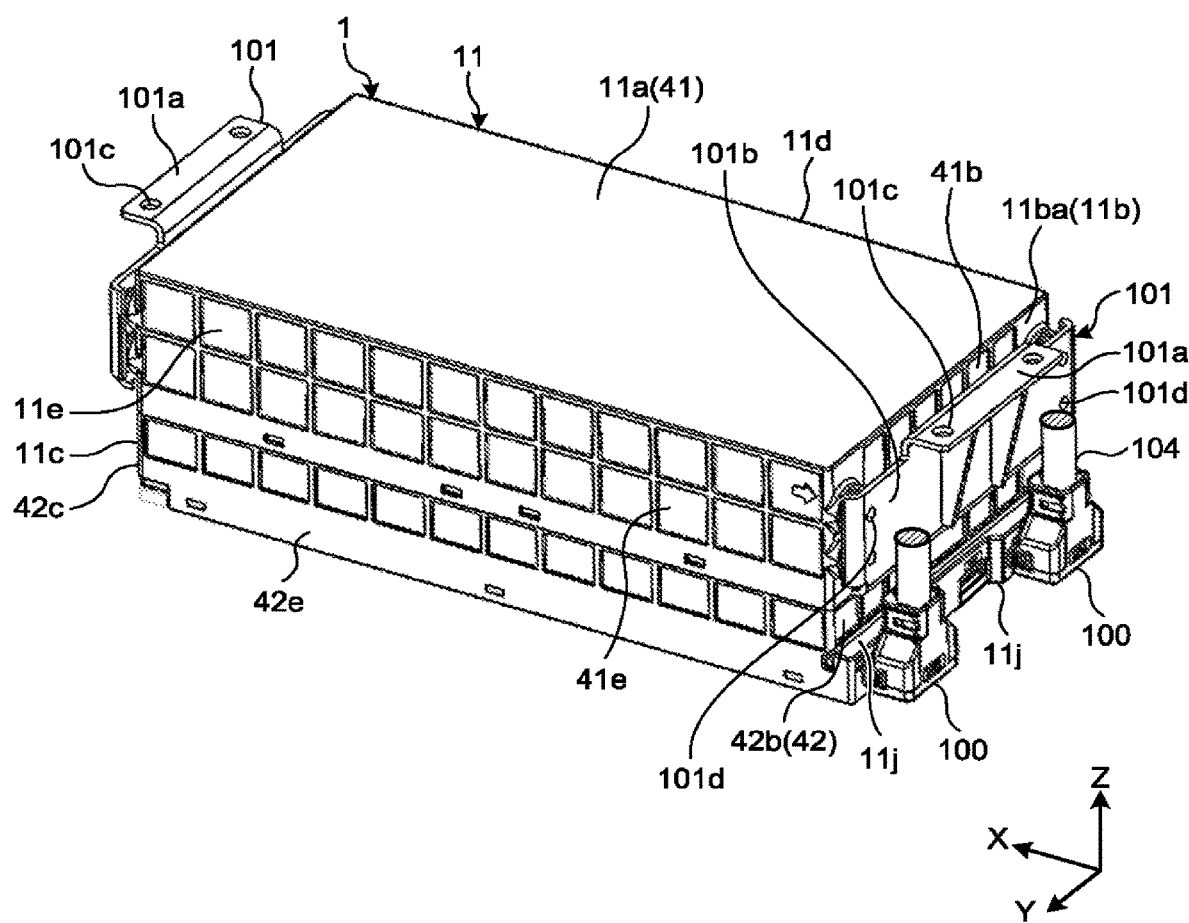
FIG. 4 is a schematic and exemplary perspective view of the battery pack of the first embodiment, when viewed from a bottom face.

The bracket 101 has a bottom wall 101a and an upright wall 101b, for example. The bottom wall 101a has a quadrangular plate shape extending along the mount 103. As illustrated in FIGS. 2 and 4, the bottom wall 101a is provided with openings 101c through which the bolts 102 pass. The upright wall 101b has a rectangular plate shape extending along the end walls 11b and 11c of the casing 11 and is connected to the end of the bottom wall 101a on the end walls 11b and 11c side. The upright wall 101b is provided with openings 101d through which the bolts 102 pass. The brackets 101 has a substantially L-shape of the bottom wall 101a and the upright wall 101b connected to each other in Y-directional view. The brackets 101 are an example of a first support member and can also be referred to as attachment members or fixing members.

Figure 3:
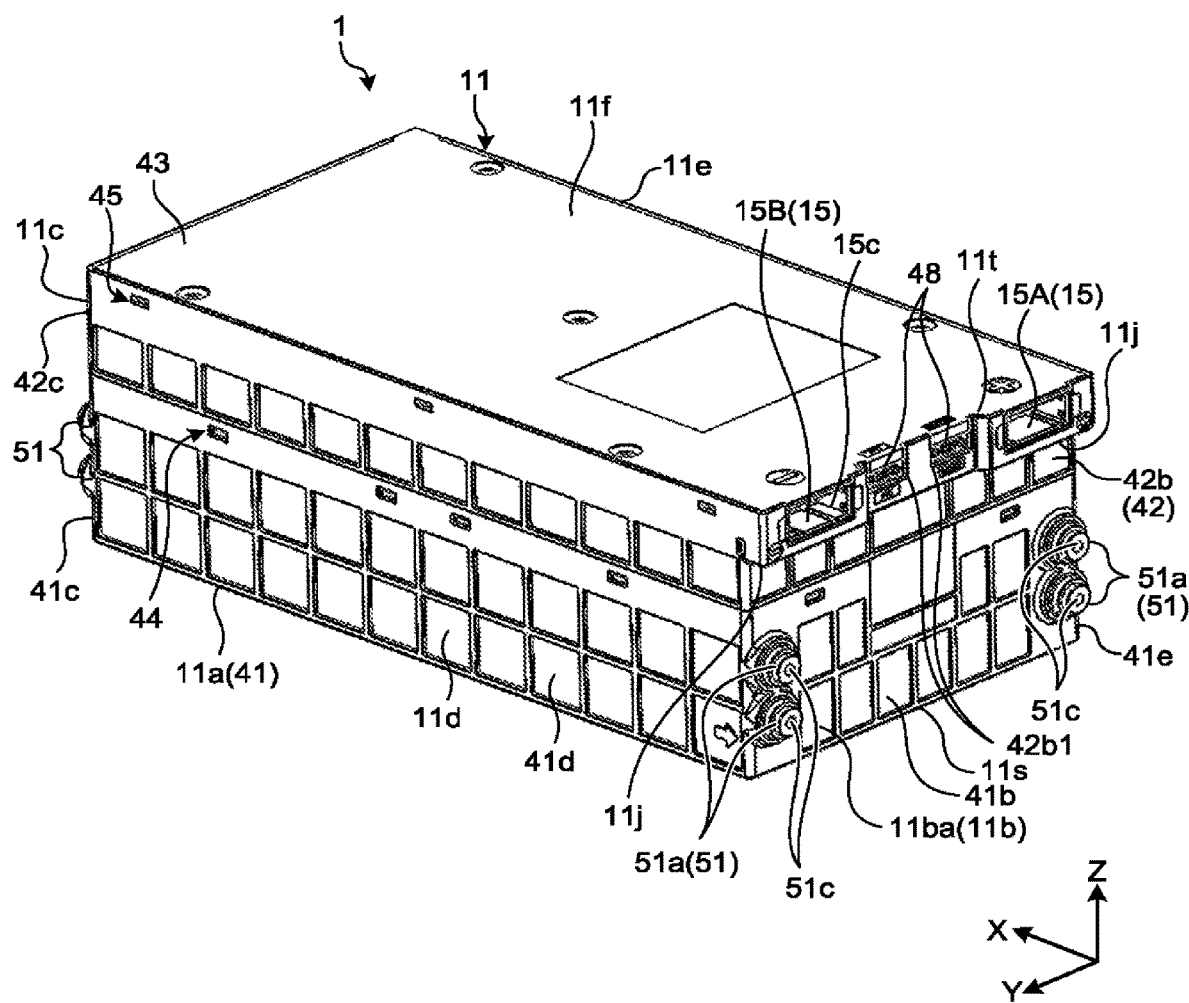
FIG. 3 is a schematic and exemplary perspective view of the battery pack of the first embodiment.
Figure 5:
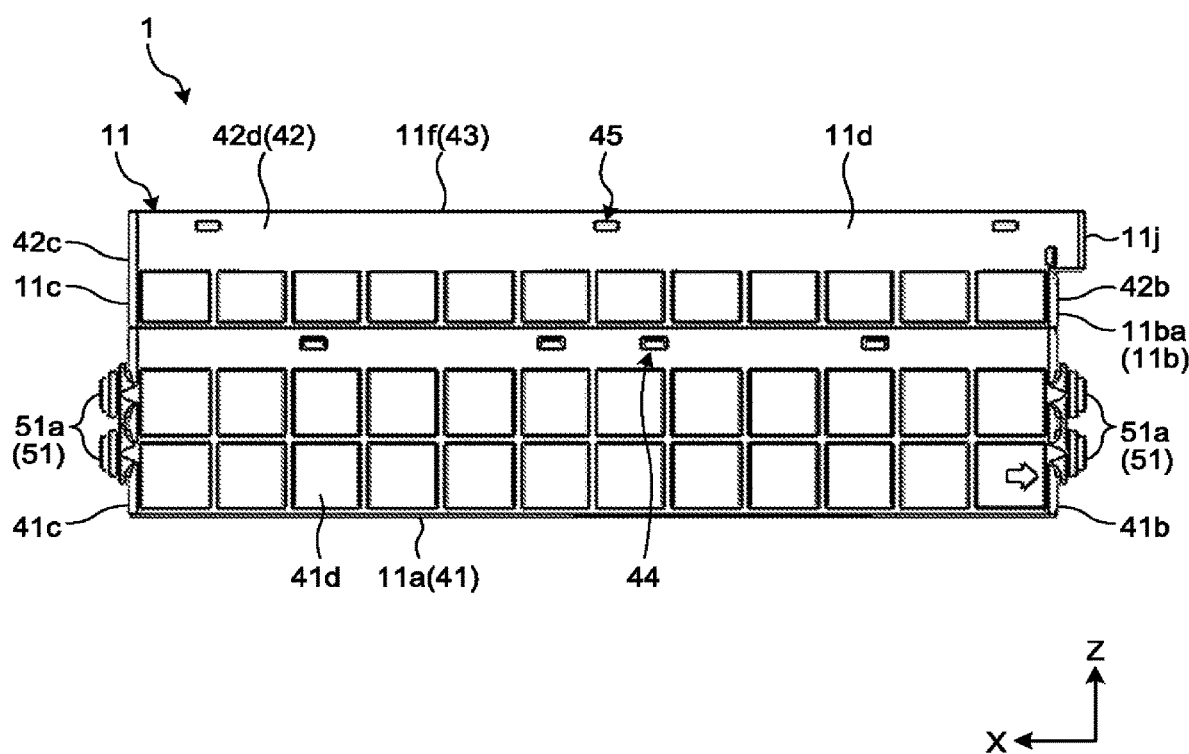
FIG. 5 is a schematic and exemplary side view of the battery pack of the first embodiment.

As illustrated in FIGS. 3 and 5, the end walls 11b and 11c of the casing 11 are each provided with a plurality of nuts 51. The nuts 51 include second screws 51c (refer to FIGS. 3 and 15) that are connectable to first screws 102a (refer to FIG. 2) of the bolts 102. The first screws 102a are male screws formed on the outer faces of shafts of the bolts 102, while the second screws 51c are female screws formed on the inner faces of tubes 51a of the nuts 51. The nuts 51 are integrated with the casing 11 by insert molding, for example. The nuts 51 are fixed to the end walls 11b and 11c with at least the second screws 51c exposed to the outside of the casing 11. In the present embodiment, the bolts 102 are screwed into the nuts 51, holding the upright walls 101b (refer to FIGS. 1 and 2) in-between them, whereby the casing 11 is supported by (fixed to) the brackets 101. The bolts 102 are screwed into nuts on the back side of the mount 103, holding the mount 103 and the bottom walls 101a in-between them, whereby the brackets 101 are fixed to the mount 103. With this configuration, the casing 11 (the battery pack 1) is fixed to the mount 103 via the brackets 101. The brackets 101 and the bolts 102 are an example of a fixing structure. The bolts 102 that join the bottom wall 101a with the mount 103 may be screws. The nuts 51 are an example of a second nut.

A sheet-like heat conductive member can be provided between the bottom wall 11a of the casing 11 and the mount 103. The heat conductive member is formed of a synthetic resin material containing a heat conductive filler (a metallic material), for example. As illustrated in FIG. 4, with the brackets 101 attached to the casing 11, the bottom face of the bottom wall 11a and the bottom face of the bottom wall 101a are aligned along the same plane. In the present embodiment, the bolts 102 and the nuts 51 are screwed together while two bottom walls 101a aligned in the X direction are pressed against the mount 103, whereby the heat conductive member is compressed in the Z direction between the bottom wall 11a and the mount 103, for example. This can bring the bottom wall 11a and the heat conductive member as well as the heat conductive member and the mount in tight contact with each other. Consequently, the heat from the battery cells 12 housed in the casing 11 can be more effectively transferred to the mount 103 via the bottom wall 11a and the heat conductive member, for example. The heat conductive member is not limited to the heat conductive sheet and may be grease or adhesive, for example.

As illustrated in FIGS. 3 and 5, the end walls 11b and 11c are each provided with a plurality of (e.g., four) nuts 51 with spacing in the Y direction and the Z direction. The brackets 101 can be selectively attached at any location with the nuts 51. The brackets 101 are secured at two points with at least two of the nuts 51 aligned in the Y direction, for example, thereby more firmly supporting the casing 11 than the brackets 101 secured at one point. In addition, in the present embodiment, the casing 11 can be attached to the mount 103 with the nuts 51 with multiple attitudes such as a first attitude in which the bottom wall 11a faces the mount 103 (refer to FIG. 1), a second attitude in which the side wall lid faces the mount 103, and a third attitude in which the side wall lie faces the mount 103. In any of the first attitude, the second attitude, and the third attitude, the brackets 101 can be secured at two points with the two nuts 51 aligned in the Y direction and the Z direction. Different brackets 101 are used in the first attitude and the second attitude (the third attitude).

As illustrated in FIGS. 3 and 6, the nuts 51 are disposed on the end walls 41b and 41c of the housing 41, in the end walls 11b and 11c. The two nuts 51 aligned in the Z direction are separated substantially in the same distance from the middle point between the end walls 41b and 41c in the Z direction. In the case of disposing the nuts 511 on the end walls 42b and 42c of the intermediate member 42, the upright walls 101b of the brackets 101 (refer to FIGS. 1 and 2) may need to be extended to overlap with the end walls 42b and 42c in the X direction. In this respect, disposing the nuts 51 on the end walls 41b and 41c in the present embodiment contributes to downsizing the upright walls 101b of the brackets 101 in the Z direction. The end walls 41b and 41c or the end walls 42b and 42c may be provided with a display for a serial number and the like at positions offset from the upright walls 101b in the X direction and in the Z direction. The present embodiment is advantageous, for example, in that the display for a serial number is less likely to be covered and hidden by the brackets 101 since the brackets 101 are downsized in the Z direction, for example.

As illustrated in FIGS. 3 and 6, the end wall 42b is provided with the connectors 15A and 15B. The connectors 15A and 15B are located between the two nuts 51 aligned in the Y direction. In other words, in the present embodiment, the connectors 15A and 15B and the nuts 51 (second screws 51c) are offset in the Y direction. As illustrated also in FIG. 1, the external connectors 100 are connected to the connectors 15A and 15B. Output cables 104 of the external connectors 100 extend in the Z direction, are bent toward the mount 103 in the X direction, and are drawn out from the external connectors 100, for example. If the connectors 15A and 15B and the nuts 51 are not offset in the Y direction, the output cables 104 of the external connectors 100 may interfere with the nuts 51 and the bolts 102 screwed into the nuts 51. In this respect, the offset arrangement of the connectors 15 and 16 and the nuts 51 in the Y direction in the present embodiment helps avoid the inconvenience described above. The connectors 15A and 15B are an example of a connector-connect. The Y direction is an example of a first direction.

As illustrated in FIG. 6, the nuts 51 (the second screws 51c) are disposed on the end wall 41b in the end wall 11b, and the connectors 15A and 15B are disposed on the end wall 42b in the end wall 11b. With this configuration, the nuts 51 (the second screws 51c) are located closer to a bottom end 11s than to a top end 11t of the end wall 11b, while the connectors 15A and 15B are located closer to the top end lit than to the bottom end 11s of the end wall 11b.

Consequently, according to the present embodiment the connectors 15A and 15B and the nuts 51 can be further spaced apart from each other in the Z direction, for example. This can inhibit the bracket 101 attached to the nuts 51 from interfering with the connectors 15A and 15B and the external connectors 100 connected to the connectors 15A and 15B, for example. The bottom end 11s is an example of a first end. The top end 11t is an example of a second end.

As illustrated in FIG. 3, in the present embodiment, the end wall 11b of the casing 11 is provided with the nuts 51, the connectors 15A and 15B, and the connectors 48, therefore, the bracket 101, the external connectors 100, and the connectors 32 can be arranged around the end wall 11b with higher density. This may enable effective use of the space in the casing 11 excluding the periphery of the end wall 11b, such as the space around the side walls 11d and 11e, and closer arrangement of a plurality of battery packs 1 (battery units) in the Y direction, for example.

Figure 15:
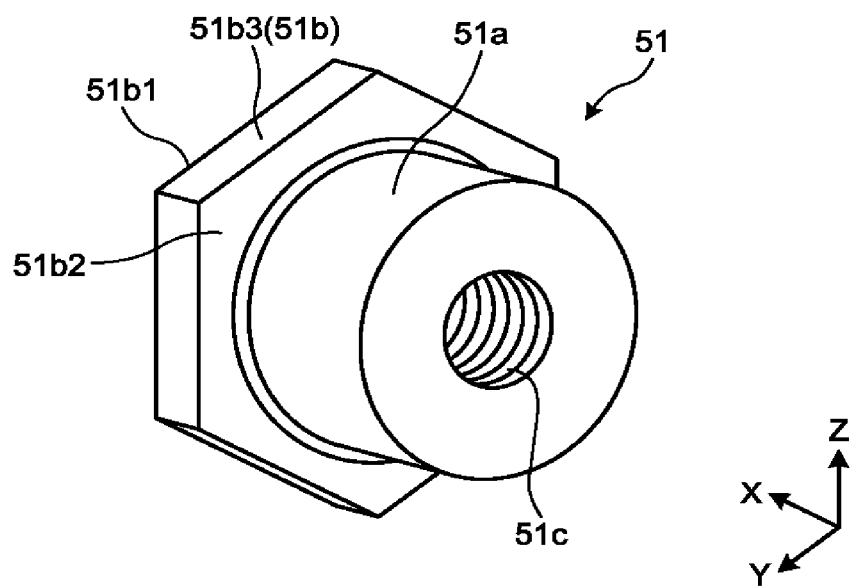
FIG. 15 is a schematic and exemplary perspective view of a second nut of the battery pack of the first embodiment.

As illustrated in FIG. 15, the nut 51 includes the tube 51a and a flange 51b, for example. The tube 51a has a cylindrical shape extending in the thickness direction of the end walls 11b and 11c, that is, the X direction. The inner face of the tube 51a (inside the tube) is provided with the second screw 51c. The flange 51b is located at an X-directional end of the tube 51a and projects radially (the YZ plane) outward from the tube 51a. The flange 51b has a hexagonal shape (a polygonal shape), for example, in X-directional view. The second screw 51c of the nut 51 has a closed end in the X direction, that is, opposite the bracket 101. The nut 51 can be formed by thread-cutting an opening of a hexagonal columnar rod and grinding part of the outer face of the rod into a circular shape, for example.

Figure 13:
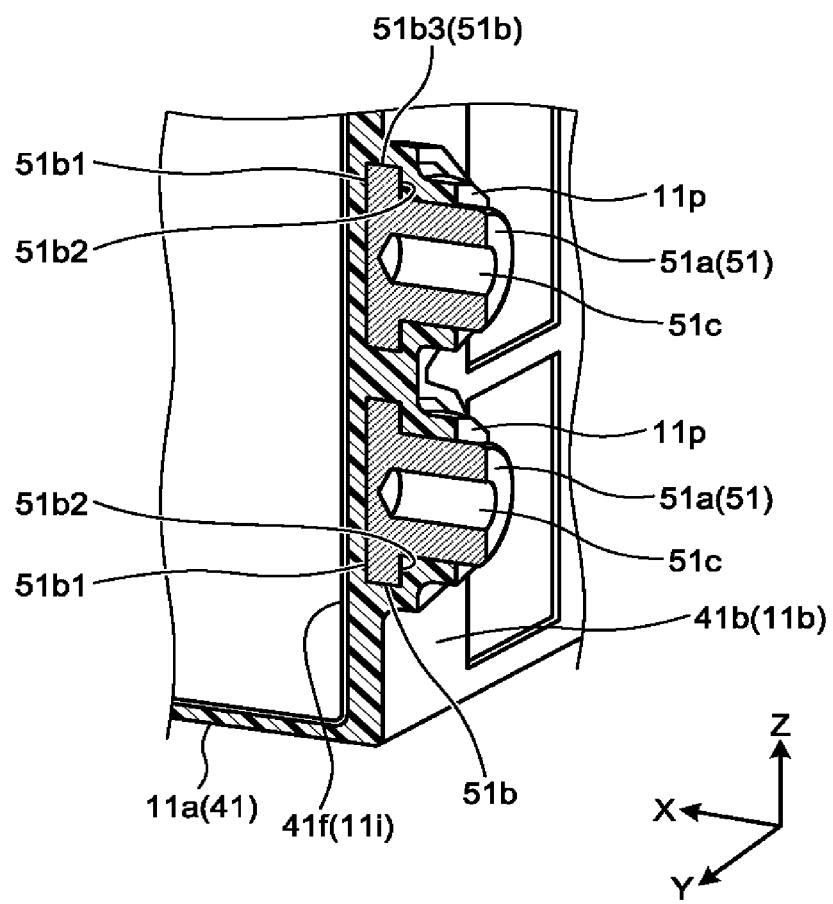
FIG. 13 is a schematic and exemplary perspective view (partially sectional view) of a part of a first outer wall of the battery pack of the first embodiment.
Figure 14:
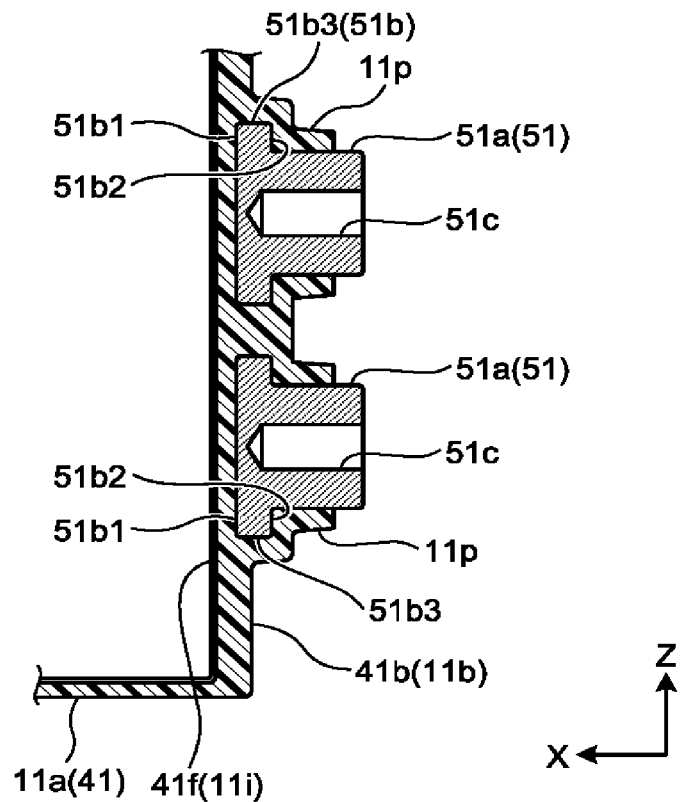
FIG. 14 is a schematic and exemplary sectional view of the part of the first wall of the battery pack of the first embodiment.

As illustrated in FIGS. 13 and 14, the nuts 51 are integrated with the casing 11 with the flanges 51b and at least part of the tubes 51a embedded in the end walls 11b and 11c. The flanges 51b each have a face 51b1 facing the X direction, a face 51b2 facing in the opposite X direction, and a face 51b3 facing radially (the YZ plane) outward. The faces 51b1 and 51b2 of the flanges 51b and the resin of the end walls 11b and 11c engage with each other, thereby restricting the nuts 51 from moving in the X direction relative to the end walls 11b and 11c, that is, from coming off from the end walls 11b and 11c. In addition, the engagement of the faces 51b3 of the hexagonal flanges 51b and the resin of the end walls 11b and 11c restricts the nuts 51 from radially and circumferentially moving (rotating) relative to the end walls 11b and 11c.

The end walls 11b and 11c are provided with covers 11p. The covers 11p protrude from radially outside the flanges 51b in the X direction and protrude radially inward to cover the faces of the flanges 51b opposite the battery cells 12, that is, the faces 51b2 of the flanges 51b. The tubes 51a are partially covered with the covers 11p, and at least partially protrudes beyond the covers 11p in the X direction. The nuts 51 are formed of a magnetic material, for example.

As described above, in the present embodiment, the connectors 15 (first connector) are provided on the protrusions 11j, for example. This allows the location of the connectors 15 to be easily found in the present embodiment, for example, and facilitates work for connecting the external connectors 100 (second connector) to the connectors 15, for example. Further, the cables 104 connected to the external connectors 100 are inhibited from contacting with the outer face 11ba of the end wall 11b, for example. The degree of freedom of the arrangement of the cables 104 can be enhanced, for example.

In the present embodiment, at least part of the connector 15 is housed in the chamber 11jh of the protrusion 11j, for example. According to the present embodiment, thus, the connectors 15 can be protected by the protrusions 11j, for example.

In the present embodiment, the conductive members 14 (first conductive member) include the bent parts 14c and 14d between the terminal 14a (first terminal) and the terminal 14b (second terminal), for example. According to the present embodiment, thus, when vibration occurs during the assembly of the battery pack 1 or from a mobile structure such as a vehicle in which the battery pack 1 is installed, applying load on the conductive members 14, the deformation of the bent parts 14c and 14d can relax stress concentration on the terminals 14a, 14b. This can improve the reliability of connection among the conductive members 14, the battery cells 12, and the connectors 15. In addition, the deformation of the bent parts 14c and 14d can eliminate variations in the arrangement of the connectors 15 and the battery cells 12, if they occur.

In the present embodiment, the support 11ga movably supports the nut 47 (first nut) in the axial direction of the central axis Ax of the nut 47, for example. According to the present embodiment, thus, when vibration occurs during the assembly of the battery pack 1 or from a mobile structure such as a vehicle in which the battery pack 1 is installed, applying load on the conductive members 14, the conductive members 14 and 15b can move together with the nut 47, relaxing stress concentration on the terminals 14a, 14b, and 15d of the conductive members 14 and 15b. In addition, the movement of the nut 47 can eliminate variations in the arrangement of the connectors 15 and the battery cells 12, if they occur.

In the present embodiment, the nut 47 includes the flange 47b projecting radially outward from the tube 47a, and the flange 47b has the face 47d (the first face) on which the conductive members 14 and the conductive member 15b are stacked, for example. Thus, according to the present embodiment the area for supporting the conductive members 14 and the conductive member 15b can be increased, compared with the tube 47a, without the flange 47b, on which conductive members 14 and the conductive member 15b are stacked, for example. This can relax stress concentration on the conductive members 14 and the conductive member 15b.

In the present embodiment, the flange 47b has a non-circular shape when viewed in the direction along the central axis Ax, for example. The support 11ga has a shape to extend along the outer circumference 47e to surround the outer circumference 47e. While being in contact with the outer circumferential face 47e, the support 11ga restricts the rotation of the nut 47 about the central axis Ax. According to the present embodiment, thus, an operator does not need to apply detent action to the nut 47, therefore, can easily connect the male screw member 49 to the nut 47, for example.

In the present embodiment, the battery pack 1 includes the casing 11 supported by the brackets 101 (first support member) and including the insulating end walls 11b and 11c, the battery cells 12 housed in the casing 11, and the second screws 51c formed in the end walls 11b and 11c and connectable to the first screws 102a (the bolts 102), for example. The casing 11 is supported by the brackets 101 with the first screws 102a attached to the second screws 51c, holding the brackets 101 in-between the first screws 102a and the second screws 51c. Consequently, according to the present embodiment the battery pack 1, in which the casing 11 is attachable to the brackets 101 with a simpler structure of the second screws 51c in the end walls 11b and 11c, can be attained, for example.

In the present embodiment, the second screws 51c are formed by the nuts 51 (female screws) at least part of which is embedded in the end walls 11b and 11c, for example. According to the present embodiment, thus, the battery pack 1 can be further simply structured than the one including the second screws 51c formed by the bolts 102 (male screws), for example. This can reduce the time and effort, and costs required for the manufacture of the battery pack 1, and more easily or more accurately integrate the end walls 11b and 11c and the nuts 51 together, for example.

In the present embodiment, the nuts 51 each include the tube 51a containing the second screw 51c and the flange 51b that projects radially (the YZ plane) outward from the end of the tube 51a opposite the bracket 101, for example. Consequently, according to the present embodiment the flanges 51b can work to inhibit the nuts 51 from moving in the X direction relative to the end walls 11b and 11c and coming off from the end walls 11b and 11c, for example.

In the present embodiment, the flanges 51b have a polygonal shape in the thickness direction of the end walls 11b and 11c, that is, in X-directional view, for example. Consequently, according to the present embodiment the polygonal flanges 51b can restrict the nuts 51 from circumferentially moving (rotating) relative to the end walls 11b and 11c and enables more smooth, more accurate, or more secure work for connecting the first screws 102a and the second screws 51c, for example.

In the present embodiment, the end walls 11b and 11c are provided with the covers 11p that protrude from radially outside the flanges 51b to cover the faces 51b2 of the flanges 51b opposite the battery cells 12, for example. Without the covers 11p of the end walls 11b and 11c, the part of the end walls 11b and 11c opposing the faces 51b2 of the flanges 51b may be decreased in thickness. In this respect, according to the present embodiment the covers 11p can prevent the part opposing the faces 51b2 of the flanges 51b from decreasing in thickness and more surely prevent the nuts 51 from coming off from the end walls 11b and 11c.

In the present embodiment, at least part of the tubes 51a protrude beyond the covers 11p in the thickness direction of the end walls 11b and 11c, that is, the X direction, for example. According to the present embodiment, thus, the tubes 51a work to inhibit contact between the brackets 101 and the covers 11p, reducing influence from the contact between the brackets 101 and the covers 11p, for example.

In the present embodiment, the second screws 51c of the nuts 51 have the closed end opposite the bracket 101, for example. Consequently, according to the present embodiment the first screws 102a (the bolts 102) are more surely inhibited from entering into the end walls 11b and 11c and the chamber 11i of the casing 11 than when the second screws 51c have an open end opposite the bracket 101, for example.

In the present embodiment, the nuts 51 are formed of a magnetic material, for example. According to the present embodiment, thus, the nuts 51 can be held at any location on the end walls 11b and 11c with magnets during the integral molding of the casing 11 and the nuts 51, for example, which may contribute to easier or more accurate integration of the end walls 11b and 11c and the nuts 51. In addition, the nuts 51 may be joined with magnets on the end walls 11b and 11c and be held at (fixed to) any location on the end walls 11b and 11c, for example.

In the present embodiment, the end wall 11b is provided with the connectors 15A and 15B (connector-connect) at location closer to the top end 11t (second end) than to the bottom end 11s (first end), and is provided with the second screws 51c at location closer to the bottom end 11s than to the top end 11t, for example. Consequently, according to the present embodiment the connectors 15A and 15B and the second screws 51c can be further spaced apart from each other in the Z direction, for example. This can prevent the brackets 101 attached to the second screws 51c from interfering with the connectors 15 and 16 and the external connectors 100 connected to the connectors 15 and 16, or can downsize the brackets 101 in the Z direction, for example. In addition, due to the smaller-size brackets 101, the display for a serial number or else, when provided on the end walls 11b and 11c, may be avoided from being covered and hidden by the brackets 101.

In the present embodiment, the connectors 15A and 15B and the second screws 51c are offset in the Y direction (first direction), for example. According to the present embodiment, thus, the output cables 104 of the external connectors 100 connected to the connectors 15A and 15B can be prevented from interfering with the second screws 51c (the nuts 51) and the first screws 102a (the bolts 102) screwed into the second screws 51c, for example.

In the present embodiment, with the external connectors 100 and the connectors 15 connected to each other, the cables 104 connected to the external connectors 100 extend along the end wall 11b, for example. In such a configuration, in the present embodiment the connectors 15 are disposed on the protrusions 11j Consequently, according to the present embodiment the gap between the cables 104 and the outer face 11ba of the end wall 11b can be widened compared with no protrusions 11j provided, for example.

In the present embodiment, the bottom wall 11a of the casing 11 is connected to the mount 103, and the nuts 51 are connected to the mount 103 via the brackets 101. This can create multiple heat transfer paths between the casing 11 and the mount 103, facilitating heat radiation from the battery pack 1. As described above, the bottom wall 11a may be connected to the mount 103 via the heat conductive member.

Other Embodiments

Figure 16:
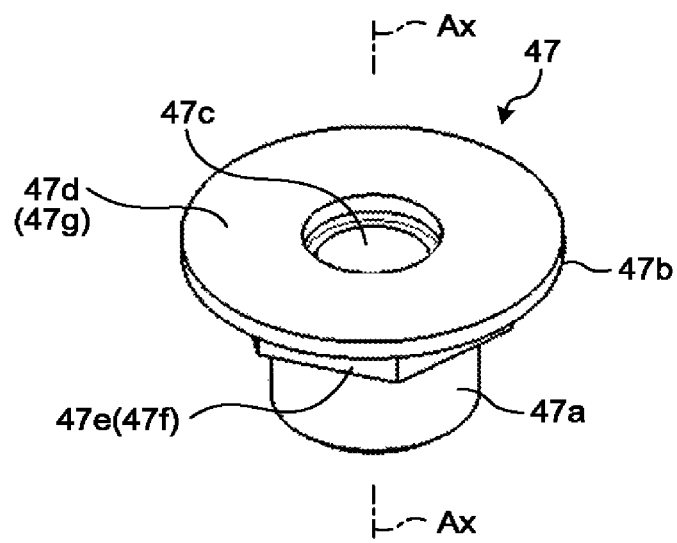
FIG. 16 is a schematic and exemplary perspective view of the first nut of a battery pack of a second embodiment.
Figure 17:
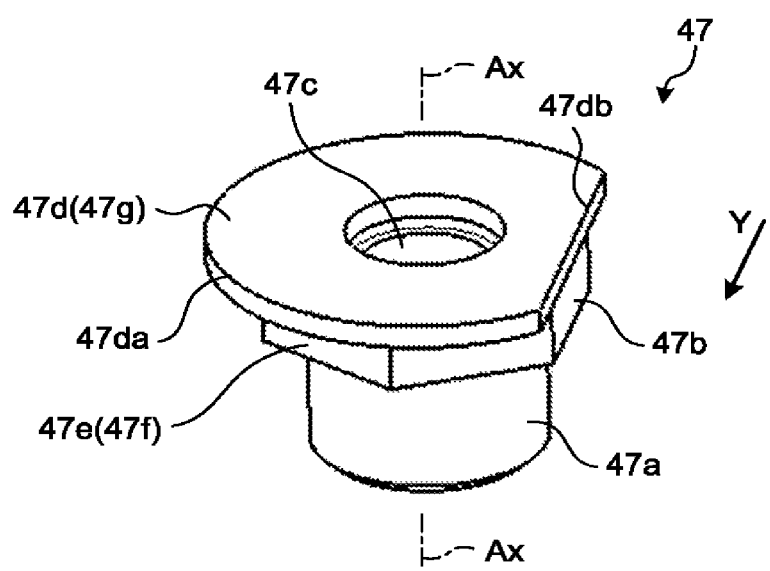
FIG. 17 is a schematic and exemplary perspective view of the first nut of a battery pack of a third embodiment.
Figure 18:
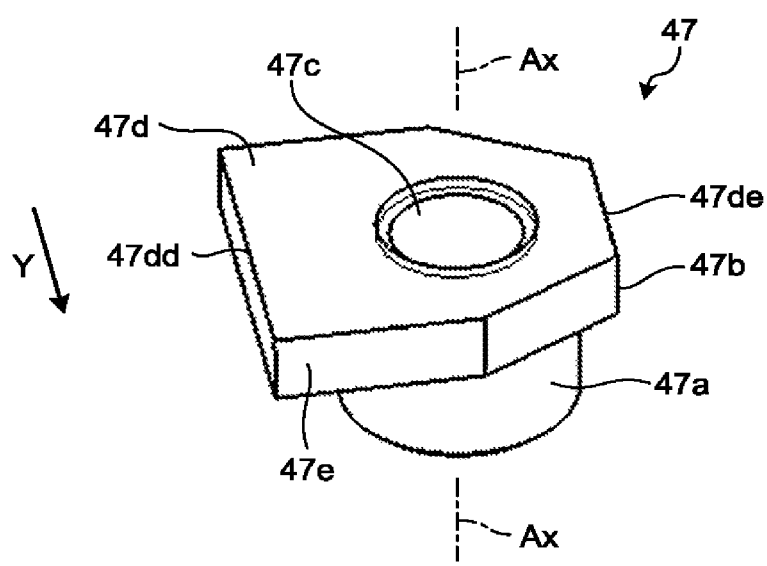
FIG. 18 is a schematic and exemplary perspective view of the first nut of a battery pack of a fourth embodiment.

The following describes second to fourth embodiments illustrated in FIGS. 16 to 18, respectively. The battery packs of the second to the fourth embodiments have features similar to those of the battery pack 1 of the first embodiment. Consequently, the present embodiments can also attain similar results (effects) based on the features similar to those of the first embodiment. However, the battery packs of the second to the fourth embodiments are different from the first embodiment mainly in the nut 47.

In the nut 47 of the second embodiment illustrated in FIG. 16, the flange 47b includes two parts (a first part 47f and a second part 47g) different in amount and shape of projection. The first part 47f has an outer circumference 47e and projects radially outward from the tube 47a. The second part 47g is connected to the first part 47f. The second part 47g has the face 47d, and at least partially (entirely as an example) projects radially outward from the first part 47f. The area of the face 47d is larger than a cross sectional area of the first part 47f orthogonal to the central axis Ax.

As described above, in the present embodiment, the area of the face 47d is larger than the cross sectional area of the first part 47f orthogonal to the central axis Ax. Consequently, according to the present embodiment the supporting part for the conductive members 14 and the conductive member 15*b* can be increased in area, for example. This makes it possible to relax stress concentration on the conductive members 14 and the conductive member 15*b*.

The nut 47 of the third embodiment illustrated in FIG. 17 includes a first part 47*f* and a second part 47*g*, as with the nut 47 of the second embodiment. However, in the present embodiment, the face 47*d* (the second part 47*g*) is asymmetrical relative to the central axis Ax. In other words, the face 47*d* includes, on the outer circumference, a pair of parts that are radially opposite to each other about the tube 47*a* relative to the central axis Ax and are in different distances (shortest distance) from the central axis Ax. As an example, the face 47*d* includes, on the outer periphery, a curved part 47*da* having a constant curvature and a linear part 47*db*. The distance (shortest distance) between the curved part 47*da* and the central axis Ax is different from the distance (shortest distance) between the center of the linear part 47*db* and the central axis Ax are different from each other, for example.

In addition, the distance (shortest distance) between the center of the linear part 47*db* and the central axis Ax is shorter than the distance (shortest distance) between the curved part 47*da* and the central axis Ax. The nut 47 with such a structure is placed with an attitude in which the linear part 47*db* lies in the Y direction as an example. Thereby, the body 15*a* of the connector 15 and the nut 47 are made closer to each other in the X direction. This can downsize the battery pack 1 and improve volume energy density thereof.

The nut 47 of the fourth embodiment illustrated in FIG. 18 includes an outer circumference 47*e* and a face 47*d* which are continuous, as with the first embodiment. However, in the present embodiment, the face 47*d* is asymmetrical relative to the central axis Ax. In other words, the face 47*d* includes, on the outer circumference, a pair of parts that are radially opposite to each other about the tube 47*a* relative to the central axis Ax and are in different distances (shortest distance) from the central axis Ax. As an example, the face 47*d* includes linear parts 47*dd* and 47*de* on the outer circumference. The distance (shortest distance) from the central axis Ax to the linear part 47*de* is shorter than the distance (shortest distance) from the central axis Ax to the linear part 47*dd*. The nut 47 with such a structure is placed with an attitude that the linear parts 47*dd* and 47*de* lie in the Y direction, as an example. Thereby, the body 15*a* of the connector 15 and the nut 47 are made closer to each other in the X direction than the linear part 47*de* and the linear part 47*dd* placed in the same distance from the central axis Ax, for example. This can downsize the battery pack 1 and improve volume energy density thereof.

In the second to the fourth embodiments described above, the inner faces of the supports 11*ga* are shaped to extend along the nut 47, as with the first embodiment. The supports 11*ga* of the second to the fourth embodiments can attain action and effects similar to those of the support 11*ga* of the first embodiment.

Although the above embodiments have described the example in which the first connector is a female connector and the second connector is a male connector, the embodiments are not limited to such an example. The first connector may be a male connector, and the second connector may be a female connector. In addition, the first screw member may be a nut, and the second screw member may be a male screw member.

While the embodiments of the present invention have been exemplified, the embodiments are merely exemplary and are not intended to limit the scope of the invention. The embodiments can be performed in a variety of other forms; various omissions, substitutions, combinations, and changes can be made without departing from the gist of the invention. The embodiments are included in the scope and the gist of the invention and are included in the scope of the invention described in the claims and equivalents thereof. The present invention can also be performed by configurations other than those disclosed in the embodiments and can achieve various effects (including derivative effects) achieved by the basic configuration (technical feature). The specifications (structure, type, direction, shape, size, length, width, thickness, height, number, arrangement, position, material, and the like) of the components can be changed as appropriate.

The invention claimed is:

1. A battery pack comprising:
a casing including a first outer wall and a protrusion that is provided on the first outer wall and protrudes outward from the first outer wall;
a plurality of battery cells that includes an electrode terminal and is housed in the casing;
a first connector that is provided on the protrusion and is electrically connected to the electrode terminal;
a first screw member;
a second screw member connected to the first screw member;
a support that is provided in the casing and movably supports the first screw member in an axial direction of a central axis of the first screw member; and
a first conductive member electrically connected to the electrode terminal, wherein
the first connector includes an insulating body and a second conductive member supported by the body, and
the first conductive member and the second conductive member are held between the first screw member and the second screw member.

2. The battery pack according to claim 1, wherein
the protrusion include an end face in a protruding direction of the protrusion, and a chamber open to the end face, and
at least part of the first connector is housed in the chamber.

3. The battery pack according to claim 1, further comprising
a first conductive member including a first terminal, a second terminal, and bent parts between the first terminal and the second terminal, the first terminal electrically connected to the electrode terminal, the second terminal electrically connected to the first terminal.

4. The battery pack according to claim 1, wherein the first screw member is a first nut.

5. The battery pack according to claim 4, wherein the first nut includes:
an annular tube about the central axis; and
a flange including a first face on which the first conductive member and the second conductive member are stacked, the flange that projects radially outward from the tube.

6. The battery pack according to claim 5, wherein
the flange has a non-circular shape when viewed in a direction along the central axis, and
the support includes a second face that is shaped to extend along an outer circumference of the flange to surround the outer circumference, and restricts the first nut from rotating about the central axis while being in contact with the outer circumference.

7. The battery pack according to claim 6, wherein
the flange includes a first part and a second part, the first part that includes the outer circumference and projects radially outward from the tube, the second part that is connected to the first part, includes the first face, and at least partially projects radially outward from the first part, and
an area of the first face is larger than a cross sectional area of the first part orthogonal to the central axis.

8. The battery pack according to claim 5, wherein the first face is asymmetrical relative to the central axis.

9. The battery pack according to claim 1,
wherein
the first outer wall has insulating properties, and
the casing is supported by a first support member of the support, with the first screw fitted into the second screw, holding the first support member in-between the first screw and the second screw.

10. The battery pack according to claim 9, wherein the second screw is formed by a second nut at least part of which is embedded in the first outer wall.

11. The battery pack according to claim 9, wherein
the casing includes a second outer wall connected to a second support member, and
the second screw is connected to the second support member via the first support member.

12. The battery pack according to claim 1, wherein a cable connected to a second connector extends along the first outer wall with the second connector electrically connected to the first connector.

* * * * *